US009470015B2

(12) United States Patent
Hull

(10) Patent No.: US 9,470,015 B2
(45) Date of Patent: Oct. 18, 2016

(54) MULTI-PURPOSE GRASPING ATTACHMENT

(71) Applicant: Curtis Hull, Clarinda, IA (US)

(72) Inventor: Curtis Hull, Clarinda, IA (US)

( * ) Notice: Subject to any disclaimer, the term of this patent is extended or adjusted under 35 U.S.C. 154(b) by 103 days.

(21) Appl. No.: 13/968,911

(22) Filed: Aug. 16, 2013

(65) Prior Publication Data

US 2015/0047861 A1    Feb. 19, 2015

(51) Int. Cl.
*E04H 17/26* (2006.01)
*A01G 23/06* (2006.01)
*A01G 17/16* (2006.01)

(52) U.S. Cl.
CPC ............ *E04H 17/265* (2013.01); *A01G 17/16* (2013.01); *A01G 23/065* (2013.01)

(58) Field of Classification Search
CPC .. A01G 23/06; A01G 23/062; A01G 23/065; E04H 17/265
See application file for complete search history.

(56) References Cited

U.S. PATENT DOCUMENTS

| 3,074,447 | A | * | 1/1963 | Bombardler | 144/3.1 |
|---|---|---|---|---|---|
| 3,163,458 | A | * | 12/1964 | Brandt, Jr. | 294/197 |
| 3,163,944 | A | * | 1/1965 | Whitcomb | 111/101 |
| 3,289,865 | A | * | 12/1966 | Hamilton et al. | 414/537 |
| 3,311,350 | A | * | 3/1967 | Irwin | 254/132 |
| 3,333,717 | A | * | 8/1967 | Scaperotto | 414/741 |
| 3,643,920 | A | * | 2/1972 | Widegren et al. | 254/124 |
| 3,646,976 | A | * | 3/1972 | McColl | 144/242.1 |
| 3,747,651 | A | * | 7/1973 | Bangert et al. | 144/34.2 |
| 3,834,560 | A | * | 9/1974 | Miller | 414/23 |
| 3,911,981 | A | * | 10/1975 | Tucek | 144/34.5 |
| 3,937,340 | A | * | 2/1976 | Grove | 414/740 |
| 3,974,925 | A | * | 8/1976 | McKenzie | 414/23 |
| 4,056,134 | A | * | 11/1977 | Bakowski | 144/24.13 |
| 4,355,476 | A | * | 10/1982 | Engkvist | 37/406 |
| 4,718,816 | A | * | 1/1988 | King | 414/739 |
| 4,775,276 | A | * | 10/1988 | McMillan | 414/23 |
| 5,174,701 | A | * | 12/1992 | Small | 410/47 |
| 5,438,772 | A | * | 8/1995 | Mieger | 37/406 |
| 5,471,747 | A | * | 12/1995 | Morikawa | B23D 35/001 144/34.5 |
| 5,516,250 | A | * | 5/1996 | Sawyer | 414/23 |
| 6,010,294 | A | | 1/2000 | Lyddon | |
| 6,267,544 | B1 | * | 7/2001 | Neville | 414/23 |
| 6,592,316 | B2 | * | 7/2003 | Hensler | 414/23 |
| 7,198,312 | B2 | * | 4/2007 | Blaho | 294/106 |
| 8,544,946 | B2 | * | 10/2013 | Holden | 297/197 |
| 8,561,325 | B1 | * | 10/2013 | Hegener et al. | 37/301 |
| 2015/0042116 | A1 | * | 2/2015 | Jacobson | A01D 87/122 294/197 |

\* cited by examiner

*Primary Examiner* — Jamie L McGowan
(74) *Attorney, Agent, or Firm* — McKee, Voorhees & Sease, PLC

(57) ABSTRACT

A grasping attachments for utility tractors is provided and, particularly, a hydraulically-operated front end loader attachments for skid loaders is provided. The multi-purpose attachment allows an operator to remain in the tractor cab while grasping, pulling, and/or lifting bulky objects that would normally require the operator to step away from the cab or request the assistance of one or more persons. Such objects may include planted trees, bushes, or posts that require removal from the soil and transportation for disposal. The attachment includes a fixed jaw and a pivoting jaw, where the fixed jaw is positioned relative to the frame of the attachment such that there is a larger area between the jaws to surround and grasp an object.

20 Claims, 3 Drawing Sheets

MULTI-PURPOSE GRASPING ATTACHMENT

FIELD OF THE INVENTION

The present invention relates in general to grasping attachments for utility tractors, particularly, to hydraulically-operated front end loader attachments for skid-steer loaders. The purpose of the invention is to provide a multi-purpose attachment that allows an operator to remain in the tractor cab while grasping, pulling, and/or lifting bulky objects that would normally require the operator to step away from the cab or request the assistance of one or more persons.

BACKGROUND OF THE INVENTION

Smaller than a conventional tractor, a skid-steer loader or skid loader is widely used in the construction, ranching, and farming industries because of its modest size, maneuverability in tight spaces, and lower cost. A skid loader is a rigid frame, engine powered machine with lift arms typically attached to a conventional bucket. However, the bucket may be exchanged with a wide variety of labor-saving tools or attachments powered by the skid loader's hydraulic system. Such skid loader attachments include, for example, backhoes, hydraulic breakers, pallet forks, angle brooms, sweepers, augers, mowers, snow blowers, stump grinders, tree spades, trenchers, dumping hoppers, rippers, tillers, grapplers, tilters, rollers, snow blades, wheel saws, cement mixers, and wood chippers. Newer skid loaders have a connection for external hydraulic systems, so that hydraulics on the attached equipment can be connected readily to the loader's hydraulic system.

Though sometimes equipped with tracks, skid loaders usually are four wheel drive vehicles with the left-side drive wheels independent of the right-side drive wheels. By having each side independent of the other, wheel speed and direction of rotation of the wheels determine the direction the skid loader will turn. Skid loaders are capable of zero-radius, "pirouette" turning, which makes them extremely maneuverable and valuable for jobs that require a compact, agile loader. Moreover, skid loaders may be operated by one user where steering is controlled by two hand levers and attachments are simultaneously operated by foot pedals.

Currently, large bulldozers, tractors, or backhoes are typically required for removing posts, trees, and shrubs deeply rooted into the ground. Such operations are time consuming, awkward, and may require more than one person. For example, an operator will typically drive up to the unfortunate tree, step out of the tractor, wrap a heavy logging chain around the tree trunk, attach the logging chain to the loader of the tractor, climb back into the tractor, and then—hopefully—remove the tree by raising up the loader. Otherwise, two persons are utilized to save time. In this instance, the operator remains in the cab of the tractor and the second person attaches and removes the logging chain around the tree, shrub, or post. Notably, this method is only useful for removing small trees, shrubs, and posts in wide open spaces where a tractor, bulldozer, or backhoe has freedom to maneuver. In addition, the large machinery is very expensive.

Thus, what is needed is a tree, shrub, and/or post removing attachment for smaller machinery, such as a skid loader, that can fit in tight places, be highly maneuverable, and allow a single user to operate. What is also needed is an attachment that has the ability to remove trees, shrubs, and posts quickly, conveniently, and to lift other heavy objects as well.

BRIEF SUMMARY OF THE INVENTION

Therefore, it is a principal object, feature, and/or advantage of the present invention to overcome the aforementioned deficiencies in the art and provide a multi-purpose attachment that can be easily attached to and removed from a utility tractor, particularly, to a skid loader, and its hydraulic system.

Another object, feature, and/or advantage of the present invention is to provide a multi-purpose attachment to a utility tractor that is capable of grasping, lifting, pulling, picking up, holding, loading, and transporting large heavy objects.

Yet another object, feature, and/or advantage of the present invention is to provide a multi-purpose attachment to a utility tractor that is attached to the front of the utility tractor for easy visibility to the operator.

A further object, feature, and/or advantage of the present invention is to provide a multi-purpose attachment to a utility tractor that has the ability to remove trees, shrubs, and posts quickly and easily.

A still further object, feature, and/or advantage of the present invention is to provide a multi-purpose attachment to a utility tractor that only requires one user to operate without requiring the user to step away from the cab of the utility tractor.

Another object, feature, and/or advantage of the present invention is to provide a multi-purpose attachment to a utility tractor that allows for high maneuverability in tight places.

Yet another object, feature, and/or advantage of the present invention is to provide a method of removing trees, shrubs, and posts quickly and easily.

These and/or other objects, features, and/or advantages of the present invention will be apparent to those skilled in the art. The present invention is not to be limited to or by these objects, features, and advantages. No single aspect need provide each and every object, feature, or advantage.

According to one aspect of the present invention, a multi-purpose attachment to a utility tractor is provided. The multi-purpose attachment comprises a frame that fits onto the loader arms on the front of the skid loader via at least one attachment section. The frame serves as a platform upon which a pair of jaw members can be employed to grasp, lift, pull, pick up, hold, load, and transport large, heavy objects. One of the jaw members is pivotally mounted on the frame and hydraulically driven by a jaw actuator assembly, while the remaining jaw member is fixedly mounted on the frame at an angle, preferably between 45-85° relative to the frame. The object sought to be grasped is positioned between the jaw members. Such positioning can be accomplished by moving the skid loader close to the object and utilizing a tilting motion of conventional skid loader arms. Through movement of the pivotally mounted jaw member, the jaw members are capable of maintaining a closed position upon the object for grasping, and an open position for releasing the object. This design produces unexpected results in that the fixed jaw member increases the stability and strength of the attachment while grasping and transporting objects, while the angle of the fixed jaw member allows larger objects to be grasped. A hydraulic connection, typically comprising hydraulic hoses, is further utilized to connect the jaw actuator assembly to the external hydraulic system of a skid loader to allow the operator to control the jaw actuator assembly. A cab guard can be further attached to the frame to protect the cab and operator of the skid loader from stray limbs, branches, or other objects while the attachment is grasping, lifting, and transporting such objects.

This design enables a single operator of the utility tractor, such as a skid loader, to lift and move heavy objects that would normally require two or more persons to accomplish. This is all accomplished easily and conveniently without the operator leaving the cab of the skid loader. Furthermore, the angle of the jaw members enables irregular objects, in addition to large trees, shrubs, and posts, to be grasped, lifted, and transported. Utilizing the tilting motion of conventional tractor arms, additional torque can be applied to increase the lifting force of the attachment. For example, jaw members may be positioned around and near the base of a tree trunk, which may be eight inches or more in diameter. Upon closing the jaw members, the tractor arms may be tilted to apply extra leverage against the ground while simultaneously lifting the tree. Such approaches can be utilized to grasp and lift a variety of heavy objects by the present invention.

According to another aspect of the present invention, a method of removing trees, shrubs and/or posts quickly and easily is provided. The method includes providing a multi-purpose attachment to a utility tractor, such as a skid loader. The multi-purpose attachment comprises a frame that fits onto the loader arms on the front of the skid loader, a pair of jaw members attached to the frame, a jaw actuator assembly, and a hydraulic connection. One of the jaw members is pivotally mounted on the frame and hydraulically driven by the jaw actuator assembly, while the remaining jaw member is fixedly mounted on the frame at an angle, preferably between 45-90° relative to the frame, and more preferably between 60-80°. The hydraulic connection typically comprises hydraulic hoses utilized to connect the jaw actuator assembly to the external hydraulic system of a skid loader to allow an operator to control the jaw actuator assembly. The method further includes actuating the jaw members into an open position. The method includes positioning the tree, shrub, or post between the jaw members in the open position by moving the skid loader close to the tree, shrub, or post and utilizing the tilting motion of conventional skid loader arms. The jaw members are then transitioned into a closed position, wherein the jaw members close tightly upon the tree, shrub, or post for grasping. The method further includes raising the conventional skid loader arms to remove the tree, shrub, or post from the ground. The tree, shrub, or post is then transported to the desired location by moving the skid loader, wherein the jaw members are finally actuated into the open position for releasing the object.

Different aspects may meet different objects of the invention. Other objectives and advantages of this invention will be more apparent in the following detailed description taken in conjunction with the figures. The present invention is not to be limited by or to these objects or aspects.

DESCRIPTION OF FIGURES

FIG. 1 an overall perspective view of the present invention attached to a skid loader.

FIG. 2 is a top plan view of the invention of an attachment wherein the jaw members are in an open position.

FIG. 3 is a top plan view of the invention of FIG. 2 wherein the jaw members are in a closed position.

FIG. 4 is a side plan view of the invention of FIG. 2.

FIG. 5 is an opposing side plan view of the invention of FIG. 4.

DETAILED DESCRIPTION OF THE INVENTION

Figure 1:
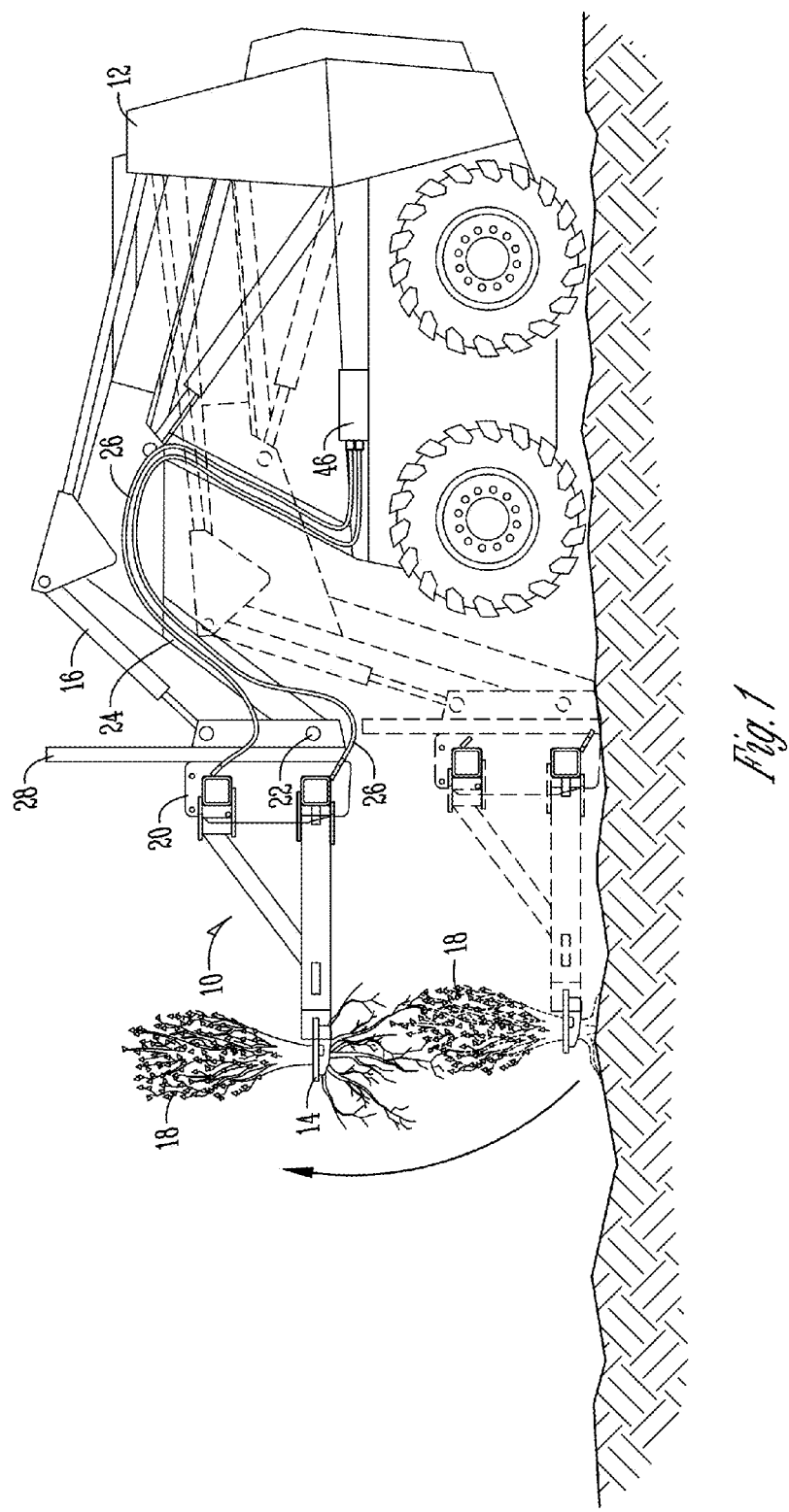
FIGS. 1-5 represent examples of multi-purpose attachments of the present invention.

The present invention provides a grasping attachment 10 for utility tractors, particularly, to hydraulically-operated front end loader attachments for skid loaders. Such attachments are capable of grasping and lifting a heavy object, moving it to a new location, and setting it down without the skid loader operator leaving the cab of the skid loader. The object may be simply or oddly shaped, and it may be moved to a location that requires it to be lifted over a barrier like a wall. Trees, bushes, or fence posts can be pulled from the ground and moved to a rubble or debris bin for hauling. Accordingly, FIG. 1 shows an embodiment of a grasping attachment 10 attached to a conventional skid loader 12. Other vehicles can also be used, including track-type skid loaders or tractors. The unique configuration of the attachment 10 that is pivotally mounted on the loader arms 24 of the skid loader 12 at a pivotal mount and via actuators 16, allows the attachment 10 to be tilted during use. Using conventional skid loader operation, the attachment 10 can be tilted forward to grab, for example, a shrub 18, close to, at, or just beneath the ground surface. When this motion is reversed to raise or lift the shrub, the skid loader causes the jaw members 14 to tilt back, thus providing torque to the shrub being lifted. In addition, tilting the attachment 10 forward slightly when grasping the shrub 18 allows the jaw members 14 to be driven into the ground as the skid loader 12 is moved forward. This enables jaw members 14 to be positioned as low as possible under the shrub 18, or other object, for removal. It also maximizes the lifting force when the attachment 10 is used to uproot shrubs, trees, or to pull posts from the ground.

The weight of the object that can be lifted depends on the nature of the skid loader used, for example the rated lifting capacity, and the heft with which the inventive tool is manufactured. The skid loader may be manufactured from lighter or heavier materials depending on the strength characteristics required. While the lifting force of a skid loader may be rated at about 1,700 lbs., however, by tilting the attachment the application of torque maximizes the lifting force applied to the object.

The attachment 10 is easily attached to and detached from the skid loader 12. In the embodiment shown in FIGS. 1-5, a frame 20 of the attachment 10 is attached to skid loader arms 24 using at least one attachment section 22. In other embodiments, the attachment 10 may be attached in a conventional fashion using a single attachment section, for example, via a post or rod connection in the middle of frame 20. Tilt can be controlled by at least one actuator 16 on skid loader 12. Other suitable conventional attachment mechanisms generally well known to practitioners in this art may also be utilized. Additionally, at least one jaw actuator connection 26, typically comprising hydraulic hoses with corresponding hydraulic couplings, connect attachment 10 to the external hydraulic system 46 of skid loader 12 for providing power and operational control. An optional cab guard 28 may also be attached onto frame 20 (e.g., via welds or bolts) for protecting the cab of the skid loader 12 and operator from stray limbs, branches, or other objects during grasping, lifting, and transportation.

Figure 2:
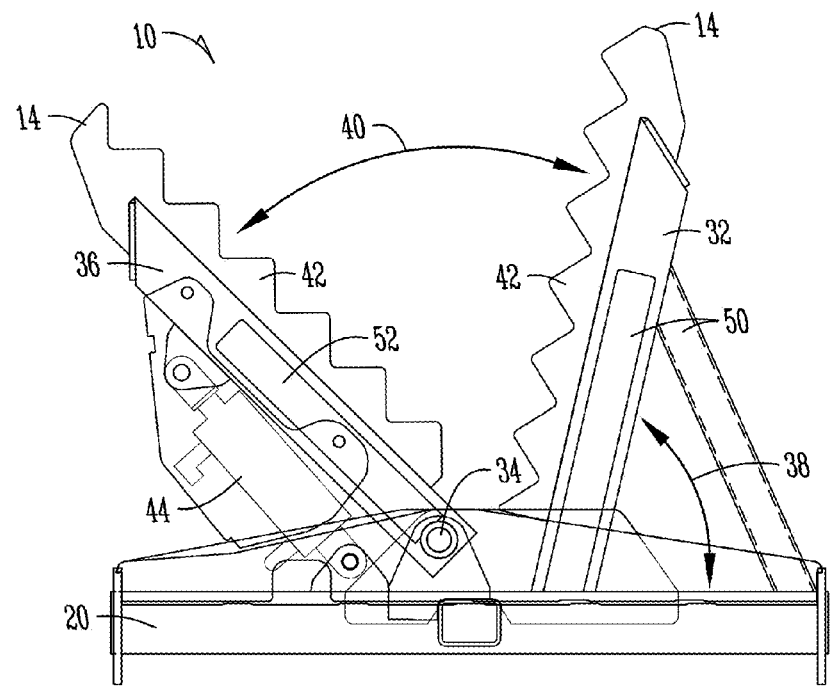

FIG. 2 is a view of one aspect of a grasping attachment 10 of the present invention for a utility tractor, such as a skid loader, wherein the jaw members 14 are in an open position. The attachment 10 comprises a frame 20, wherein the frame 20 is made from any number of materials strong enough to support the jaw members 14. Preferably, the frame 20 comprises metal, and most preferably, continuously welded steel. The attachment 10 further comprises at least one attachment section 22 on the frame 20 that fits onto the loader arms 24 located towards the front of the skid loader 12. A fixed jaw member 32 is fixedly attached to the frame 20, wherein the fixed jaw member 32 does not pivot, rotate, or otherwise move in relation to the frame 20. Moreover, the fixed jaw member 32 is fixedly mounted on the frame 20 at an angle 38, for example between 45-90°, and more preferably between 60-80°. At least one fixed reinforcing member 50, preferably two, is fixedly attached to the frame 20 and the fixed jaw member 32, forming a triangle support that provides increased strength and stability to the fixed jaw member 32. Similar to the fixed jaw member 32, the fixed reinforcing member 50 also does not pivot or move in relation to the frame 20. This inventive design, incorporating the fixed jaw member 32 supported by at least one fixed reinforcing member 50, produces unexpected results in increased strength and stability of the attachment 10 while grasping and transporting objects. Furthermore, the particular angle of the fixed jaw member 32 in relation to the frame 20 allows larger objects to be grasped and transported. For example, it is contemplated that trees approximately eight inches or more in diameter may be removed with use of the attachment 10 of the present invention.

As further illustrated in FIG. 2, a pivotal jaw member 36 is pivotally mounted on the frame 20 and opposite the fixed jaw member 32. The pivotal jaw member 36 may be pivotally mounted on the frame 20 by a first rod 34, or other similar mechanisms recognized by those of ordinary skill in the art. In the open position, the pivotal jaw member 36 is in a common plane with the fixed jaw member 32 and forms an angle 40. The angle 40 is variable, and can extend up to or greater than 90° between the pivotal jaw member 36 and the fixed jaw member 32. This particular angular range allows the attachment 10 to grasp larger objects, such as tree trunks 6-8 inches (or more) in diameter between the jaw members 14. The pivotal jaw member 36 is supported by a pivotal reinforcing member 52 pivotally mounted to the frame 20 by a second rod 54 (see FIG. 4), or any similar mechanisms recognized by those of ordinary skill in the art. Pivotal jaw member 36 and pivotal reinforcing member 52 form a triangle shaped support that provides increased strength and stability to pivotal jaw member 36 during movement.

Both the pivotal jaw member 36 and fixed jaw member 32 comprise saw toothed inner grasping edges 42. Such saw toothed inner grasping edges 42 increase friction, prevent slippage, and help maintain control while the jaw members 14 grasp objects. Other geometrical forms may also be utilized for inner grasping edges (e.g., waves, paddles, teeth, or the like).

As is also illustrated best in FIG. 2, the attachment 10 further comprises a jaw actuator assembly 44 configured to move the pivotal jaw member 36 from a closed position (see FIG. 3) to the open position, and vice versa. While the jaw actuator assembly 44 of the present invention is shown to comprise two hydraulic cylinder assemblies, it should be appreciated that other means could be used such as electric or gasoline motors, cables and pulleys, or other means generally known by practitioners of ordinary skill in the art. The jaw actuator assembly 44 is connected at one end (proximal) to the frame 20 and at the other end (distal) to the pivotal jaw member 36. The jaw actuator assembly 44 is further connected to the external hydraulic system 46 (see FIG. 1) on the skid loader 12 via a jaw actuator connection 26. The jaw actuator connection 26 typically comprises at least one hydraulic hose, preferably two, and at least one hydraulic coupling, also preferably two. Thus, the skid loader 12 provides hydraulic power and enables the operator in the cab of the skid loader to operate and control the jaw actuator assembly 44 through the jaw actuator connection 26.

Figure 3:
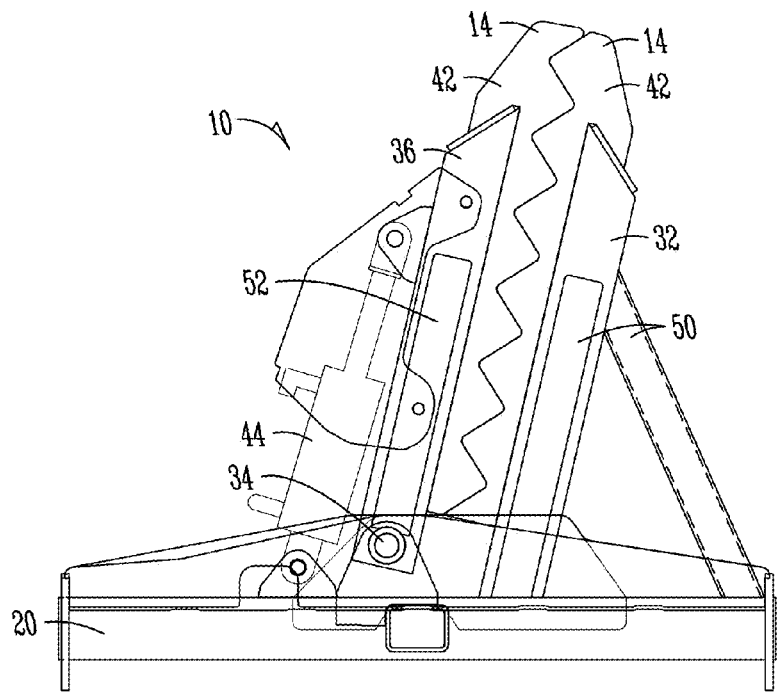

FIG. 3 illustrates a top plan view of the attachment 10, wherein the jaw members 14 are in a closed position. In the closed position, the saw-toothed inner grasping edges 42 align to fit together. When grasping an object, such as a tree, bush, or post, the jaw actuator assembly 44 moves the pivotal jaw member 36 from the open position (see FIG. 2) to the closed position (see FIG. 3) in order to grasp the object in between the saw toothed inner grasping edge 42 of the pivotal jaw member 36 and the saw toothed inner grasping edge 42 of the fixed jaw member 32. Subsequently, the attachment 10, via the loader arms 24, applies sufficient force to remove the tree, shrub, or post from the ground.

Figure 4:
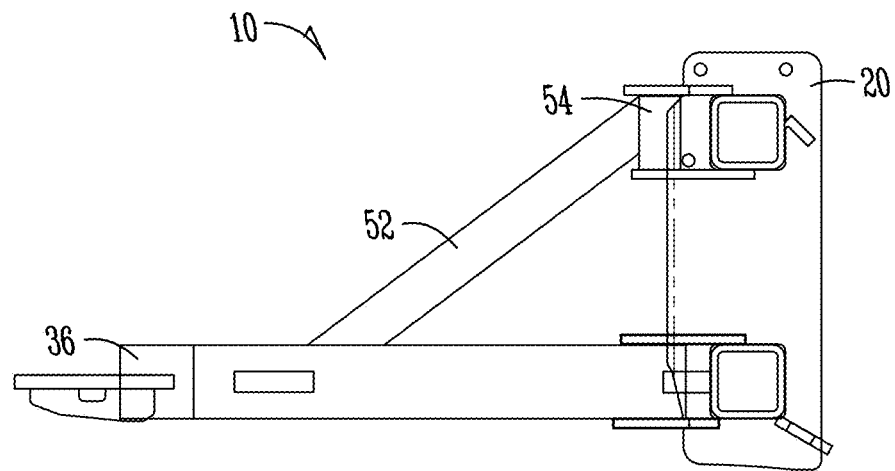
Figure 5:
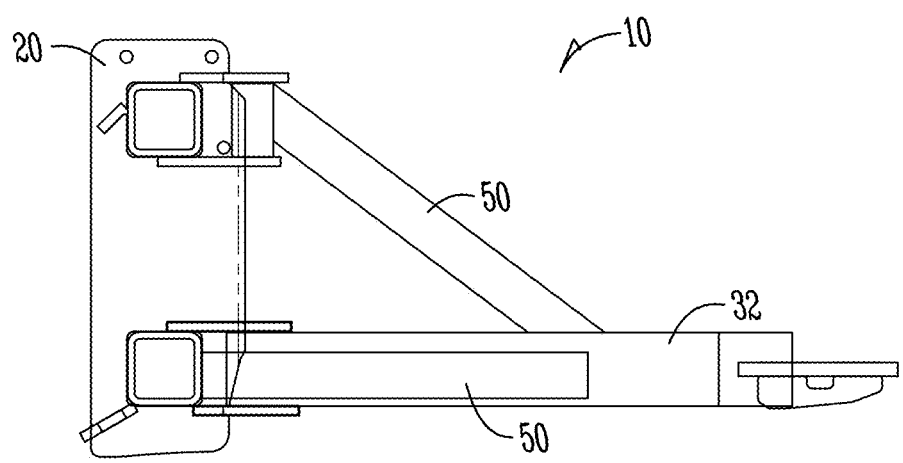

FIGS. 4 and 5 illustrate side plan views of the attachment 10 according to embodiments of the present invention. In FIGS. 4 and 5, it is readily apparent that the pivotal jaw member 36 is in a common plane with the fixed jaw member 32. FIG. 4 shows that pivotal jaw member 36 is supported by the pivotal reinforcing member 52 pivotally mounted to the frame 20 by the second rod 54. The resulting triangle shaped support provides increased strength and stability to the pivotal jaw member 36 during movement. Likewise, FIG. 5 shows wherein at least one fixed reinforcing member 50, preferably two, is fixedly attached to the frame 20 and fixed jaw member 32 to form a triangle shaped support that provides increased strength and stability to the fixed jaw member 32. As mentioned previously, this inventive design produces unexpected results in increased strength and stability of the attachment 10 while grasping and transporting objects.

According to a still further aspect of the present invention, a method of removing trees, shrubs, or posts is provided. The method includes providing the multi-purpose grasping attachment for a utility tractor, such as a skid loader, as illustrated in FIGS. 1-5 and described supra. The method further includes actuating the pivotal jaw member 36 into an open position, as illustrated in FIG. 2. The jaw actuator assembly 44 is configured to move the pivotal jaw member 36 from a closed position (see FIG. 3) to the open position (see FIG. 2), and vice versa. Next, a skid loader operator moves the skid loader 12 into position, wherein the tree, shrub, or post 18 is positioned between the jaw members 14 (e.g., between the saw toothed inner grasping edge 42 of the pivotal jaw member 36 and the saw toothed inner grasping edge 42 of the fixed jaw member 32). The jaw members 14 may be positioned around the base of the tree, shrub, or post 18 near or at the ground. The method further involves actuating the pivotal jaw member 36 into the closed position, as illustrated in FIG. 3, wherein the jaw members 14 close tightly upon and grasp the tree, shrub, or post 18. Notably, the saw toothed inner grasping edges 42 increase friction, prevent slippage, and help maintain control while the jaw members 14 grasp the object.

Subsequently, the skid loader operator raises the loader arms 24 of the skid loader 12 to apply sufficient force to remove the tree, shrub, or post 18 from the ground. This is shown in the solid and broken lines of FIG. 1, where the solid lines show the object 18 lifted out of the ground. While continuing to grasp the tree, shrub, or post 18 between the jaw members 14, the skid loader 12 is moved, thus, transporting the tree, shrub, or post 18 to a desired location (e.g. a rubble, burn pile, or debris bin for hauling). The pivotal jaw member 36 can then be actuated from the closed position (see FIG. 3) to the open position (see FIG. 2) to release the tree, shrub, or post 18 at the desired location.

EXAMPLE 1

A Bobcat® skid-steer loader, fitted with the present inventive multi-purpose grasping attachment, was used to clear shrubs from a field. The skid loader was driven up to a shrub, wherein the jaw members 14 were placed in an open position (see FIG. 2). The attachment 10 was tilted slightly downward, and lowered until the jaw members 14 were positioned at the ground or slightly beneath it. The shrub was positioned near the mid-point between jaw members 14. The jaw members 14 were then actuated into the closed position (see FIG. 3), thus, closing around shoots of the shrub. The attachment was next tilted upward and away from the ground raised by the skid loader arms 24. As a result, the shrub and its root system were lifted from the ground and ultimately deposited in a bin with other debris, all without the skid loader operator leaving the cab of the skid loader.

EXAMPLE 2

In a manner similar to that described in Example 1, trees—with tree trunks between approximately 6-8 inches in diameter—were removed from a grove or field. The entire tree, including canopy, trunk, and root system, was uprooted, moved to a disposal area, and deposited in a debris pile without the skid loader operator leaving the cab of the skid loader.

EXAMPLE 3

Akin to Examples 1 and 2, multiple fence posts were quickly and easily removed from a field using the present inventive multi-purpose grasping attachment. A skid loader, fitted with the attachment 10 was driven up to a fence post wherein the jaw members 14 were placed in the open position (see FIG. 2). The attachment 10 was lowered near the ground with the fence post positioned near the mid-point between the jaw members 14. The jaw members 14 were then actuated into the closed position (see FIG. 3), closing around the fence post. Raising the skid loader arms 24, the fence post was lifted from the ground and deposited into a wagon for transportation to a new field, all without the skid loader operator leaving the cab of the skid loader.

The multi-purpose grasping attachment of the present invention and method of removing trees, shrubs, or posts, are universally applicable to utility tractors and skid-steer loaders of all shapes and sizes, makes, models, and manufacturers. Although the invention has been described and illustrated with respect to preferred aspects thereof, it is not to be so limited since changes and modifications may be made therein which are within the intended scope of the invention. According to additional embodiments, the number of pivoting and/or fixed jaw members may vary. For example, such jaw members may be spaced vertically apart, wherein such jaw members are spaced not coplanar and are staggered vertically relative to one another. In such cases the number of actuators may vary as well to accommodate independent control of a plurality of pivoting jaw members.

What is claimed is:

1. A multi-purpose grasping attachment for a utility tractor, comprising:
    a frame;
    at least one attachment section on the frame for attaching the frame to the utility tractor;
    a pivotal jaw member pivotally mounted to the frame;
    a fixed jaw member fixedly attached to the frame and opposite the pivotal jaw member;
    a pivotal reinforcing member pivotally mounted to the frame and fixedly attached to the pivotal jaw member;
    a jaw actuator assembly comprised of two hydraulic cylinder assemblies and configured to move the pivotal jaw member relative to the fixed jaw member between open and closed positions, said pivotal and fixed jaw members capable of being substantially aligned with one another when in the closed position;
    wherein one of the two hydraulic cylinder assemblies is operably connected to the pivotal reinforcing member and the frame, and another one of the two hydraulic cylinder assemblies is operably connected to the pivotal jaw member and the frame;
    wherein the two hydraulic cylinder assemblies are oriented to be generally parallel to the pivotal jaw member; and
    wherein the fixed jaw member is angled less than 90° from the frame and being reinforced on a side opposite the pivotal jaw member to provide strength and stability for said fixed jaw member.

2. The multi-purpose grasping attachment of claim 1, further comprising a jaw actuator connection connecting the jaw actuator assembly to the utility tractor for operating and powering the jaw actuator assembly.

3. The multi-purpose grasping attachment of claim 2, wherein the fixed jaw member is separately supported by two fixed reinforcing members fixedly attached to the frame, wherein the two fixed reinforcing members do not pivot or move in relation to the frame.

4. The multi-purpose grasping attachment of claim 3, wherein the pivotal jaw member is pivotally mounted to the frame by a first rod and the pivotal reinforcing member is pivotally mounted to the frame by a second rod.

5. The multi-purpose grasping attachment of claim 1, wherein the multi-purpose grasping attachment is pivotally attached to the utility tractor, said multi-purpose grasping attachment configured to pivot about a generally horizontal axis.

6. The multi-purpose grasping attachment of claim 3, wherein the jaw actuator connection comprises at least one hydraulic hose and at least one hydraulic coupling connecting each of the two hydraulic cylinder assemblies of the jaw actuator assembly to the utility tractor for operating and powering the jaw actuator assembly.

7. The multi-purpose grasping attachment of claim 6, wherein the pivotal jaw member and the fixed jaw member comprise saw toothed inner grasping edges.

8. The multi-purpose grasping attachment of claim 1, wherein an angle formed between the pivotal jaw member with the fixed jaw member in the open position is between 45-100°.

9. The multi-purpose grasping attachment of claim 8, wherein the angle formed by the pivotal jaw member with the fixed jaw member in the open position is between 60-90°.

10. The multi-purpose grasping attachment of claim 1, wherein the angle between the fixed jaw member and the frame is between 60-80°.

11. A multi-purpose grasping attachment for a utility tractor, comprising:
- a frame;
- at least one attachment section on the frame for attaching the frame to the utility tractor;
- a pivotal jaw member pivotally mounted to the frame;
- a fixed jaw member fixedly attached to the frame and opposite the pivotal jaw member, wherein the fixed jaw member is angled less than 90° from the frame;
- a jaw actuator assembly comprised of two hydraulic cylinder assemblies and configured to move the pivotal jaw member relative to the fixed jaw member between open and closed positions;
- a jaw actuator connection connecting the jaw actuator assembly to the utility tractor for operating and powering the jaw actuator assembly;
- a pivotal reinforcing member pivotally mounted to the frame and supporting the pivotal jaw member;
- a fixed reinforcing member fixedly attached to the frame and supporting the fixed jaw member on a side opposite the pivotal jaw member to provide strength and stability for said fixed jaw member, wherein the fixed reinforcing member does not pivot or move in relation to the frame;
- a first rod that pivotally mounts the pivotal jaw member to the frame and a second rod that pivotally mounts the pivotal reinforcing member to the frame;
- wherein one of the two hydraulic cylinder assemblies is operably connected to the pivotal reinforcing member and the frame, and another one of the two hydraulic cylinder assemblies is operably connected to the pivotal jaw member and the frame;
- said pivotal and fixed jaw members capable of being substantially aligned with one another when in the closed position.

12. The multi-purpose grasping attachment of claim 11, further comprising:
- at least one hydraulic hose and at least one hydraulic coupling comprising the jaw actuator connection for connecting each of the two hydraulic cylinder assemblies of the jaw actuator assembly to the utility tractor for operating and powering the jaw actuator assembly;
- saw toothed inner grasping edges on the pivotal jaw member and the fixed jaw member, wherein such edges are aligned to fit together when the jaw members are in the closed position; and
- wherein the multi-purpose grasping attachment is configured to grasp objects in the closed position and release said objects in the open position for lifting, pulling, holding, and transporting said objects to a new location.

13. The multi-purpose grasping attachment of claim 12, wherein the angle formed by the pivotal jaw member with the fixed jaw member in the open position is between 45-95° and further wherein the fixed jaw member is fixedly mounted on the frame at an angle between 35-85°.

14. The multi-purpose grasping attachment of claim 13, wherein the angle formed by the pivotal jaw member with the fixed jaw member in the open position is between 65-75° and further wherein the fixed jaw member is fixedly mounted on the frame at an angle between 60-80°.

15. The multi-purpose grasping attachment of claim 12, further comprising a cab guard operatively attached to the frame.

16. A method of removing trees, shrubs, or posts, comprising:
- providing a multi-purpose grasping attachment for a utility tractor, comprising:
  - a) a frame;
  - b) at least one attachment section on the frame for attaching the frame to loader arms of the utility tractor;
  - c) a singular pivotal jaw member pivotally mounted to the frame;
  - d) a fixed jaw member fixedly attached to the frame and opposite the pivotal jaw member, wherein the fixed jaw member is angled less than 90° relative to the frame and being reinforced on a side opposite the pivotal jaw member to provide strength and stability for said fixed jaw member; and
  - e) a jaw actuator assembly comprising two cylinder assemblies; said cylinder assemblies to be substantially parallel to the pivotal jaw member and configured to move the pivotal jaw member relative to the fixed jaw member between open and closed positions, said pivotal and fixed jaw members capable of being substantially aligned with one another when in the closed position;
- actuating the two cylinder assemblies to pivot the singular pivot jaw member relative to the fixed jaw member and into an open position;
- moving the tractor to position a tree, shrub, or post between the jaw members in the open position, wherein the jaw members are positioned around the base of the tree, shrub, or post near or at the ground;
- actuating the pivotal jaw member towards the closed position, wherein the jaw members close tightly upon and grasp the tree, shrub, or post;
- raising the attachment to remove the tree, shrub, or post from the ground;
- transporting the tree, shrub, or post to a desired location; and
- actuating the pivotal jaw member into the open position to release the tree, shrub, or post.

17. The method of claim 16, wherein one of the two cylinder assemblies is operably connected to a pivotal reinforcing member and the frame, and another one of the two cylinder assemblies is operably connected to the pivotal jaw and the frame.

18. The method of claim 17, wherein the angle formed by the pivotal jaw member with the fixed jaw member in the open position is between 60-80°.

19. The method of claim 16, wherein the fixed jaw member is fixedly mounted on the frame at an angle between 45-85°.

20. The method of claim 19, wherein the utility tractor is a skid-steer loader.

* * * * *